United States Patent [19]

Smith

[11] Patent Number: 5,541,893

[45] Date of Patent: Jul. 30, 1996

[54] MEANS FOR PROCESSING WIDEBAND SIGNALS

[75] Inventor: Roderick A. Smith, Dorset, United Kingdom

[73] Assignee: The Secretary of State for Defence in Her Britannic Majesty's Government of the United Kingdom of Great Britain and Northern Ireland, London

[21] Appl. No.: 452,439

[22] Filed: May 26, 1995

[30] Foreign Application Priority Data

May 26, 1994 [GB] United Kingdom .................... 9410610

[51] Int. Cl.$^6$ ...................................................... H04B 11/00
[52] U.S. Cl. ............................................ 367/135; 367/901
[58] Field of Search .............................. 367/87, 98, 135, 367/136, 131, 901

[56] References Cited

U.S. PATENT DOCUMENTS 3,745,552  7/1973  Wilt .......................... 367/136

Primary Examiner—Daniel T. Pihulic
Attorney, Agent, or Firm—Nixon & Vanderhye P.C.

[57] ABSTRACT

Apparatus for processing a broadband signal, 1.2, 2.2, by determining the first and second moments of variation between frequency sub-bands, 1.4, 2.4, of the broadband signal, 1.2, 2.2, in order to either distinguish between man made objects and natural objects or detect shadows comprising splitters, 1.3, 2.3, which comprise analogue or digital filters, for separating the broadband signal into a plurality of frequency sub-band signals, 1.4, 2.4, detectors means, 1.5, 2.5, for processing each of the frequency sub-band signals, 1.4, 2.4, to either extract, identify or enhance a signal within the broadband signal, 1.2, 2.2, and combiners, 1.7, 2.7, for re-combining the processed frequency sub-band signals, 1.4, 2.4, by either summing the frequency sub-band signals, 1.4, 2.4, to produce the first moment of variation or enabling the amount of variation between the processed frequency sub-band signals, 1.4, 2.4, to be analyzed to produce the second moment of variation.

26 Claims, 2 Drawing Sheets

MEANS FOR PROCESSING WIDEBAND SIGNALS

BACKGROUND OF THE INVENTION

1. Field of the Invention

This invention relates to the processing of broad band signals and in particularly, fop use in active remote sensing sonars.

2. Discussion of Prior Art

Received broadband signals ape processed in several ways. One method of processing which is applied to broadband signals is known as highlight processing. This method is used for the detection of return signals from targets by detecting when the amplitude of the processed return signal exceeds a threshold level. One difficulty which arises with highlight processing is the ability to distinguish between the return signal from a target and reverberation echo. Reverberation is caused by a signal being reflected off natural objects such as the sea floor.

Broadband signals can also be processed to detect shadows. A shadow is created when the return signal is blocked by an object. The return signal which is usually used is the reverberation echo from a transmitted signal. Reverberation echo is generated across the whole range of distances from a receiver and therefore would be expected to be present for the whole duration of the return signal. However, when an object is located in the path of the reverberation echo, the reverberation echo is blocked by that object. Therefore, no reverberation echo would be present duping the period in which the reverberation echo from that direction would have been expected to be present. By detecting whether reverberation is present in a signal or not, it can be deduced whether there is an object present. Noise is also present throughout the whole duration of a return signal. A major problem, therefore, is being able to discriminate between the reverberation and noise.

At present the broad band signals are processed to detect the return signals in a single receive chain which may involve beam forming into a number of received beams.

SUMMARY OF THE INVENTION

The object of the present invention is to provide means by which the processing of a broad band signal in order to differentiate between features of the signal is improved, and in particular, for shadow detection and improved ability to discriminate between man made objects and natural objects.

According to one aspect of the present invention there is provided apparatus for processing a broadband signal by determining the first and second moments of variation between frequency sub-bands of the broadband signal in order to either distinguish between man made objects and natural objects or detect shadows comprising splitting means for separating the broadband signal into a plurality of frequency sub-band signals, detecting means for processing each of the frequency sub-band signals and combining means for re-combining the processed frequency sub-band signals by either summating the frequency sub-band signals to produce the first moment of variation or enabling the amount of variation between the processed frequency sub-band signals to be analyzed to produce the second moment of variation.

The present invention first separates the broad band signal in the frequency domain into several smaller frequency sub-band signals and then calculates the first and second moments of variation of these frequency sub-band signals. The moments of variation of the frequency sub-band signals are a statistical method of describing the amounts of variation there are between signals. The first moment of variation is the mean. This can be calculated by summating the frequency sub-band signals and then dividing the sum by the number of frequency sub-band signals. However, because the sum is proportional to the mean, it is much more practical to only summate the signals. This produces a larger signal which is easier to use and avoids the unnecessary step of reducing the signal by an appropriate factor. The second moment of variation measure of the variation between the frequency sub-band or signals. Therefore, the second moment of variation is calculated by measuring the variation between the signals. A second moment of variation can be produced for all of the frequency sub-band signals or they can be produced for particular groups of frequency sub-band signals depending on the requirements.

This invention is very useful in helping to detect shadows. This is achieved by having the combining means comprise a summator. As previously mentioned, in order to detect the presence of a shadow, it is important that the broadband signal is processed so that the reverberation and noise components of the signal are able to be differentiated. The level of reverberation received for a signal source with a constant level depends on the area insonified, ie. the area on which the acoustic signal is "shone" upon. The longer the transmitted pulse, the smaller the bandwidth required for the receiver and the greater the reverberation received. The level of the noise is dependent on the bandwidth of the receiver. The lower the bandwidth, the lower the noise level. Therefore, for good reverberation to noise discrimination, a low bandwidth is required.

The bandwidths of each of the frequency sub-bands are less than that of the broad band signal. However, the power of the broad band signal is also reduced proportionally when shared between the various frequency sub-band signals. Therefore, the reverberation to noise ratio in each of the frequency sub-band signals is the same as that in the broad band signal. However, when the processed frequency sub-band signals are re-combined by being added together, the spread of the distribution of the signal will be reduced a factor of the square of the number of sub-bands. Also the $P_d/P_{FA}$ ratio will be improved.

Experiments in the mine hunting sonar field have shown that there is little correlation between the various frequency components of a reverberation signal. Therefore, the signal amplitudes of the frequency components of a return reverberation signal would not be expected to be the same except on a random occurrence basis. In contrast, a signal which has been reflected off a man made object has a degree of correlation between the various frequency components of the signal. This could be due to the high degree of surface regularity of man made objects. However, until the present invention, no account has been taken of the frequency components which make up a detected signal.

The present invention utilises these variations between the signal amplitudes of the frequency components of the signal. This is achieved by analyzing the variations of the processed frequency sub-band signals. From this it is possible to determine whether a detected return signal is reverberation or a return signal from a man made object. This overcomes one of the major problems associated with highlight processing. The variations capable of being measured could be a variety of things, for instance, amplitude, phase. Ideally, the variations are measured at a particular instant in time.

Examples of the splitting means are either digital or analogue filters. If digital filters are used, they could utilize fast fourier techniques. The splitting means could further comprise wide band matched filtering techniques.

The splitting means could comprise elements of discrete frequency chirp matched processing techniques. If so, the elements of discrete frequency chirp matched processing techniques would ideally be implemented using matched filters.

The types of detecting means applied to each of the frequency sub-bands can be the same as those which are conventionally applied to broad band signals when processed as a single signal. However, by applying the detecting means to each of the frequency sub-band signals separately, further information can be gained about the detected signal relative to frequency.

The detecting means can process the frequency sub-band signals to either extract, identify or enhance a known signal within the broad band signal. An example of such a means is one which extracts, identifies or enhances a modulating signal from a carrier signal within the broad band signal.

The detecting means can be constructed using detectors comprising a diode or other non linear amplitude response circuits, filters, multipliers, delays or any combination of these. One particular type of filter which could be used is a matched filters.

The combining means can summate the processed frequency sub-band signal by using electronic circuitry which uses either analogue or digital techniques to produce an electronic signal which is proportional or equivalent to the sum of the frequency sub-band signals.

Similarly, the combining means can analyze the processed frequency sub-band signals for variations between them using electronic circuitry. The electronic circuitry could utilize either analogue or digital techniques to produce electronic signals which are a function of the variations between the frequency sub-band signals.

In either case, it desirable that the electronic circuitry includes a threshold detector or comparator. This would compare the output signal with a predetermined reference signal. The predetermined reference signal could be a reference voltage, for example. Ideally, the reference signal would have automatic gain control.

Alternatively, the combining means can comprise displaying means which maps the processed sub-band signals onto separate color intensities and then displays it to enable an operator to visually analyze the pictorial display. This would provide a visual representation of the variations in the frequency sub-band signals. The operator would be able to see the differences in the colors and intensities.

When the apparatus is being used For shadow detection, it is preferable that the bandwidths of the frequency sub-bands are greater than the inverse of the shadow duration within the reverberation echo. Furthermore, it would be ideal that the detecting means comprise a filter, the time response of the filter being such that the output signal from the filter has dropped to a low amplitude within the duration for a shadow duration within the reverberation echo.

According to another aspect of the invention there is a method for processing a broadband signal by determining the first and second moments of variation between frequency sub-bands of the broadband signal in order to either distinguish between man made objects and natural objects or detect shadows comprising the steps;

separating the broadband signal into a plurality of frequency sub-band signals;

detecting each of the sub-band signals; and re-combining the detected frequency sub-band signals by either summating the frequency sub-band signals to produce the first moment of variation or analyzing the amount of variation between the detected frequency sub-band signals to produce the second moment of variation.

One possible method of analyzing the variations comprises the steps:

mapping the detected sub-band signals onto separate color intensities;

displaying them pictorially; and visually analyzing the pictorial display.

The amplitude of either the sum of the detected frequency sub-band signals or the amount of variation could be measured by comparing it to a threshold signal. Ideally, the threshold signal is automatically adjusted.

BRIEF DESCRIPTION OF THE DRAWINGS

The invention will now be described by way of two examples and with reference to the following drawing.

DETAILED DESCRIPTION OF PREFERRED EMBODIMENTS

Figure 1:
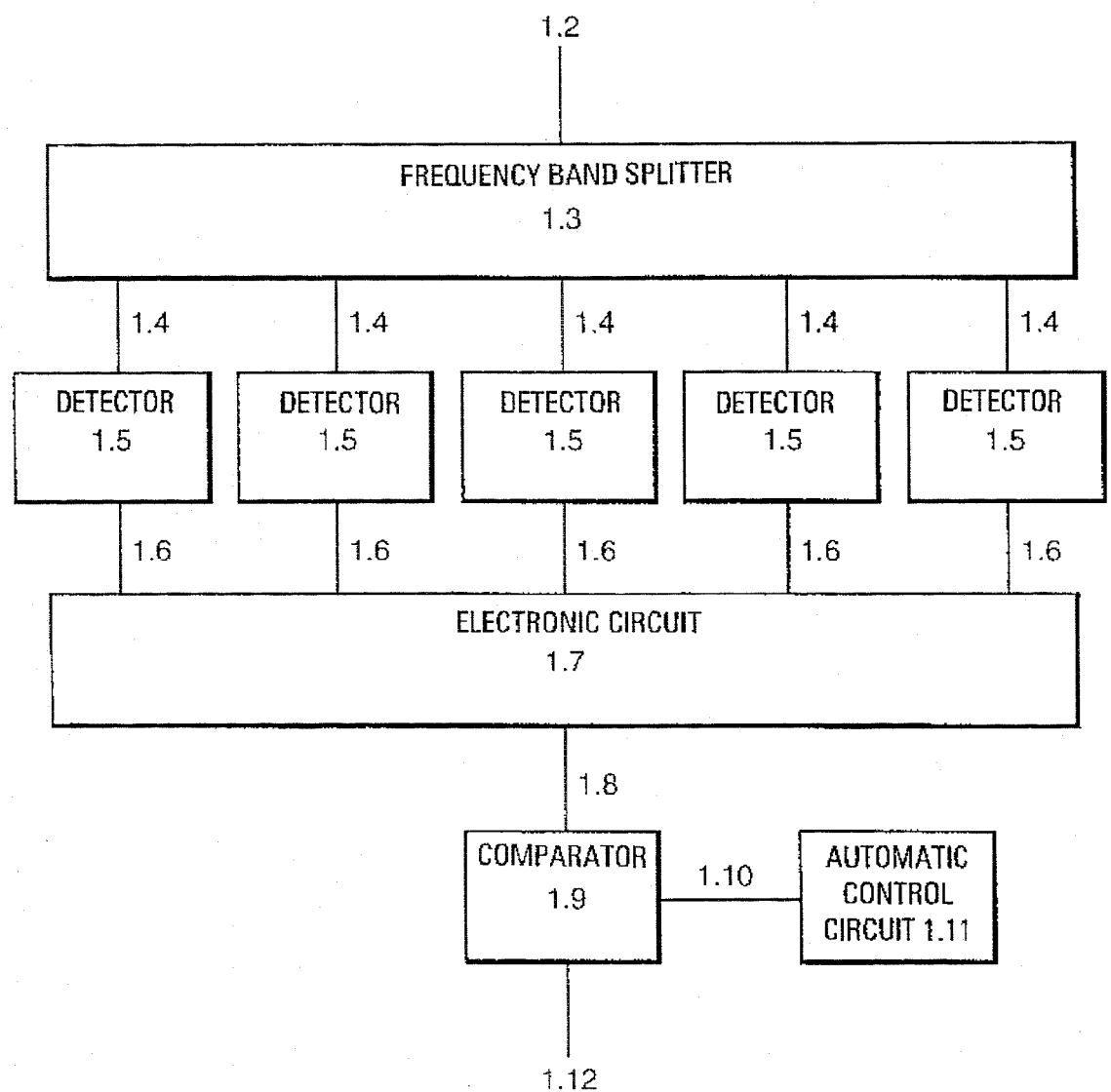
FIG.1 shows a block diagram for a highlight processor.

FIG. 1 shows a block diagram for a circuit, 1.1, which determines whether a return signal is from a man made object or a natural object. The broadband signal, 1.2, from a sonar array (not shown) is fed into a frequency band splitter, 1.3. The frequency band splitter, 1.3, comprises analog electronic filters. The frequency band splitter, 1.3, splits the signal, 1.2, into several frequency sub-band signals, 1.4. Each sub-band signal, 1.4, is then fed into a detector, 1.5. Each detector, 1.5, comprises an analog matched filter. The output signals, 1.6, of the detectors, 1.5, ape then fed into an electronic circuit, 1.7, which determines variation between the output signals, 1.6, of the detectors, 1.5. An electronic signal, 1.8, is produced by the electronic circuit, 1.7, which has an amplitude dependant on the amount of variation between the outputs, 1.6, of the detectors, 1.5. The amount of variation of the output signals, 1.6, determines the probability that any detected signal within the broad band signal, 1.2, has been reflected off a regular shaped surface, the lower the variation the higher the probability. The output signal, 1.8, is fed into a comparator, 1.9, which has a reference signal, 1.10, which is automatically adjusted by an automatic control circuit, 1.11. If the variation is greater than a predetermined amount, the comparator, 1.9, will give a signal, 1.12, indicating that the detected signal is from a natural object.

Figure 2:
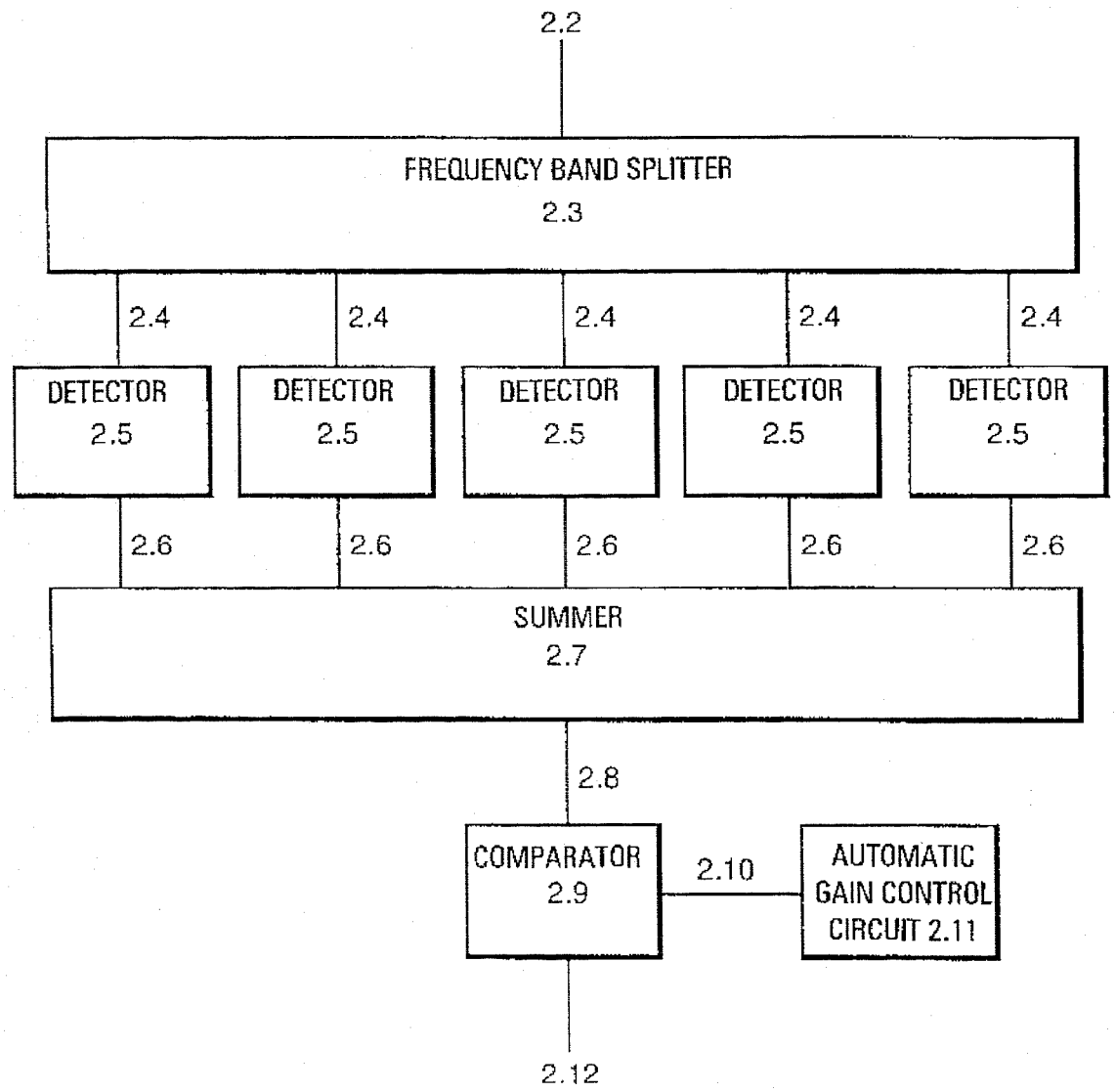
FIG.2 shows a block diagram for a shadow detector.

FIG. 2 shows a block diagram For a system, 2.1, which optimises the reverberation to noise ratio and can be used for shadow detection. The broad band signal, 2.2, from a sonar array (not shown) is Fed into a frequency band splitter, 2.3. The frequency band splitter, 2.3, comprises analog electronic filters. The frequency band splitter, 2.3, splits the broad band signal, 2.2, into several frequency sub-band signals, 2.4. The bandwidths of the frequency sub-band signals, 2.4, were selected so that they were greater than the inverse of the expected shadow length. Each frequency sub-band signals, 2.4, was then fed into a detector, 2.5. Each detector, 2.5, comprises an analog filter. The time response of the analog filters were chosen so that the time for their output response signals, 2.6, to drop to a low amplitude was within a period required for the duration of an expected shadow. The output signals, 2.6, were then added together using a summer, 2.7. The output signal, 2.8, from the summer, 2.7, was then Fed into a comparator, 2.9. The comparator, 2.9, had a threshold voltage, 2.10, which was controlled automatically by automatic gain control circuit, 2.11. The output signal, 2.12, of the comparator, 2.9, changed as the reverberation relative to the noise in the signal, 2.2, altered. From this information it can be determined whether there is a shadow present in the signal, 2.2.

I claim:

1. Apparatus for processing a broadband signal to detect a known signal within the broadband signal by determining the first and second moments of variation between frequency sub-bands of the broadband signal in order to either distinguish between man made objects and natural objects or detect shadows, said apparatus comprising:

splitting means for separating the broadband signal into a plurality of frequency sub-band signals, said splitting means comprising at least one electronic filter, a plurality of detecting means, at least one detecting means corresponding to each of said plurality of sub-band signals, for processing said frequency sub-band signals, and combining means for re-combining the processed frequency sub-band signals from said detecting means by summating the processed frequency sub-band signals to produce an electronic output signal proportional to the sum of the frequency sub-band signals to produce the first moment of variation.

2. Apparatus for processing a broadband signal as claimed in claim 1 wherein at least one electronic filter comprises a plurality of digital filters.

3. Apparatus for processing a broad band signal as claimed in claim 2 wherein said plurality of digital filters comprises digital filters which utilize fast fourier transform algorithms.

4. Apparatus for processing a broadband signal as claimed in claim 2 wherein splitting means further comprises wide band matched filtering techniques.

5. Apparatus for processing a broad band signal as claimed in claim 1 wherein the splitting means comprises elements of discrete frequency chirp matched processing techniques.

6. Apparatus for processing a broad band signal as claimed in claim 5 wherein the splitting means comprises matched filters.

7. Apparatus for processing a broad band signal as claimed in claim 1 wherein the detecting means comprises means which removes or identifies a modulating signal from a carrier signal within the broad band signal.

8. Apparatus for processing a broad band signal as claimed in claim 1 wherein the combining means further includes one of a threshold detector and comparator, the output signal is fed to said one of said threshold detector and comparator.

9. Apparatus for processing a broad band signal as claimed in claim 8 wherein said one of said threshold detector and comparator further includes a reference signal which has automatic gain control.

10. Apparatus for processing a broad band signal as claimed in claim 1 wherein the combining means includes displaying means which maps the processed sub-band signals onto separate color intensities and then displays them to enable an operator to visually analyze the pictorial display.

11. Apparatus for processing a broad band signal as claimed in claim 1 wherein the bandwidths of the frequency sub-bands are greater than the inverse of the shadow duration within the reverberation echo.

12. Apparatus for processing a broad band signal as claimed in claim 1 wherein, when the detecting means comprises a filter, the time response of the filter being such that the filter output signal has dropped to a low amplitude within the shadow duration within the reverberation echo.

13. A method for processing a broadband signal in order to detect a known signal within the broadband signal by determining the first and second moments of variation between frequency sub-bands of the broadband signal in order to either distinguish between man made objects and natural objects or detect shadows comprising the stops;

separating the broadband signal using a filter into a plurality of frequency sub-band signals;

detecting each of the sub-band signals by processing the known signal within the frequency sub-band signal; and re-combining the detected frequency sub-band signals by summating the frequency sub-band signals to produce an electronic output signal proportional to the sum of the frequency sub-band signal to produce the first moment of variation and by analyzing the amount of variation between the detected frequency sub-band signals to produce an electronic output signal which is proportional to the amount of variation between the frequency sub-bands to produce the second moment of variation.

14. A method for processing a broad band signal as claimed in claim 13 wherein analyzing the variations further comprises the steps of:

mapping each of the detected sub-band signals onto separate color intensities;

displaying them pictorially; and visually analyzing the pictorial display.

15. A method for processing a broad band signal as claimed in claim 13 wherein the further step of comparing the amplitude of the electronic output signals with a threshold signal.

16. Apparatus for processing a broadband signal as claimed in claim 1 wherein at least one electronic filter comprises a plurality of analog filters.

17. Apparatus for processing a broadband signal to detect a known signal within the broadband signal by determining the first and second moments of variation between frequency sub-bands of the broadband signal in order to either distinguish between man made objects and natural objects or detect shadows, said apparatus comprising:

splitting means for separating the broadband signal into a plurality of frequency sub-band signals, said splitting means comprising at least one electronic filter, a plurality of detecting means, at least one detecting means corresponding to each of said plurality of sub-band signals, for processing said frequency sub-band signals, and combining means for re-combining the processed frequency sub-band signals from said detecting means by analyzing the amount of variation between the processed frequency sub-band signals to produce an electronic output signal proportional to the amount of variation between the frequency sub-band signals to produce a second moment of variation.

18. Apparatus for processing a broadband signal as claimed in claim 17 wherein said at least one electronic filter comprises a plurality of digital filters.

19. Apparatus for processing a broadband signal as claimed in claim 17 wherein said at least one electronic filter comprises a plurality of analog filters.

20. Apparatus for processing a broad band signal as claimed in claim 17 wherein said plurality of digital filters comprises digital filters which utilize fast fourier transform algorithms.

21. Apparatus for processing a broadband signal as claimed in claim 17 wherein splitting means further comprises wide band matched filtering techniques.

22. Apparatus for processing a broad band signal as claimed in claim 17 wherein the splitting means comprises elements of discrete frequency chirp matched processing techniques.

23. Apparatus for processing a broad band signal as claimed in claim 22 wherein the splitting means comprises matched filters.

24. Apparatus for processing a broad band signal as claimed in claim 17 wherein the detecting means comprises means which removes or identifies a modulating signal from a carrier signal within the broad band signal.

25. Apparatus for processing a broad band signal as claimed in claim 17 wherein the combining means further includes one of a threshold detector and comparator, the output signal is fed to said one of said threshold detector and comparator.

26. Apparatus for processing a broad band signal as claimed in claim 25 wherein said one of said threshold detector and comparator further includes a reference signal which has automatic gain control.

* * * * *